United States Patent [19]

Nobori et al.

[11] Patent Number: 5,611,039
[45] Date of Patent: Mar. 11, 1997

[54] INFORMATION PROCESSING APPARATUS AND METHOD FOR COMBINING DIFFERENT MEDIA TO HAVE COINCIDING REPRODUCTION TIMES

[75] Inventors: Kunio Nobori; Yoshiyasu Kado, both of Kadoma; Masamichi Nakagawa, Hirakata, all of Japan

[73] Assignee: Matsushita Electric Industrial Co., Ltd., Osaka, Japan

[21] Appl. No.: 591,223

[22] Filed: Jan. 18, 1996

Related U.S. Application Data

[63] Continuation of Ser. No. 159,287, Nov. 30, 1993, abandoned.

[30] Foreign Application Priority Data

Nov. 30, 1992 [JP] Japan .................................. 4-320247

[51] Int. Cl.$^6$ ........................................ G06F 15/00
[52] U.S. Cl. ........................................ 395/806
[58] Field of Search ..................... 395/154, 733–735, 395/737–739; 348/512, 515; 340/825.14, 825.2

[56] References Cited

U.S. PATENT DOCUMENTS 4,641,253  2/1987  Mastran ................................ 395/154
4,839,743  6/1989  Best et al. ............................. 358/310

FOREIGN PATENT DOCUMENTS 5-3561  1/1993  Japan .

OTHER PUBLICATIONS

Allen, "Maintaining Knowledge about Temporal Intervals", Comm. of the ACM, Nov. 1983, vol. 26, No. 11, pp. 832–843.

Primary Examiner—Heather R. Herndon
Assistant Examiner—Joesph R. Burwell
Attorney, Agent, or Firm—Ratner & Prestia

[57]  ABSTRACT

An information processing apparatus and method for the same, comprising a database part, a processing-method-determining part, and an information-processing-part. The processing-method-determining part extracts from the data base part attribute characteristics corresponding to the individual media signals which correspond to the reference signals. The processing-method-determining part selects one processing method from among methods by combining the attribute characteristics. The informations processing part, based on the selected processing method, extends or reduces the reproduction time of the media signals to be combined, or discontinues an individual media signal, wherein a multimedia representation consisting of different media signals is produced with reproducing times that satisfactorily coincide.

12 Claims, 2 Drawing Sheets

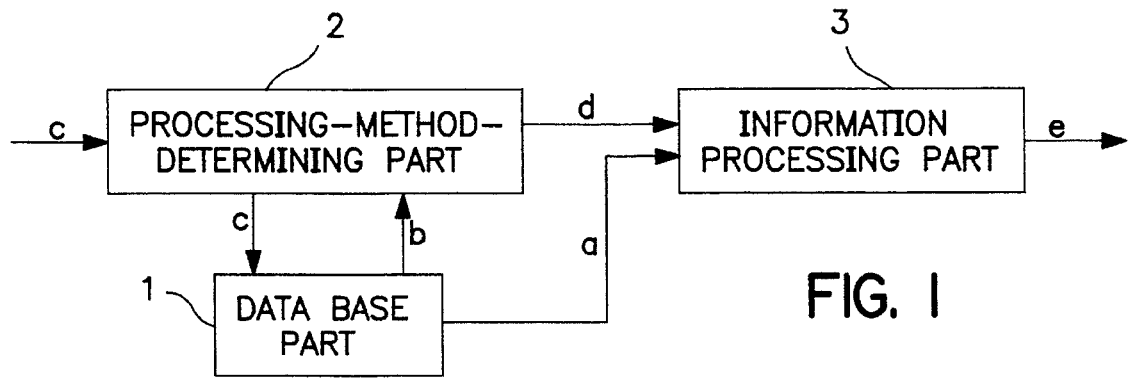
FIG. 1
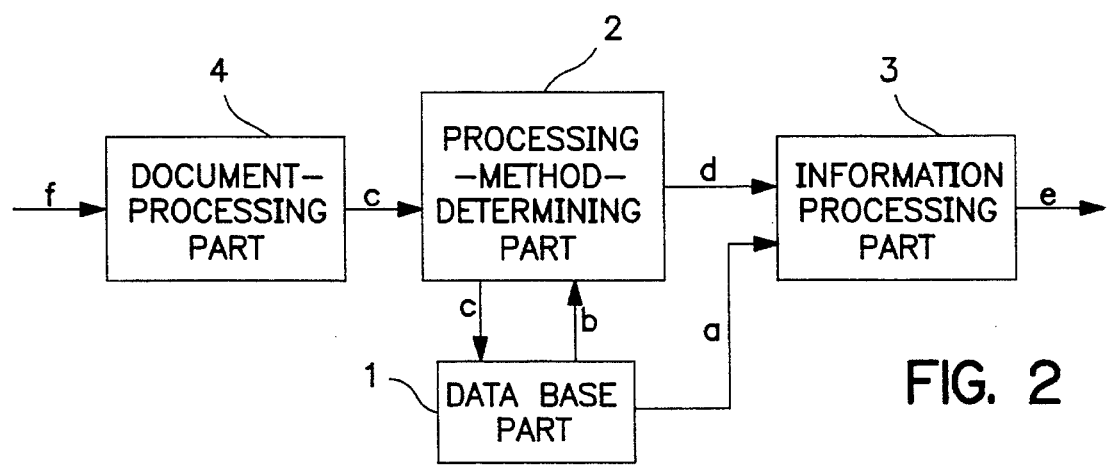
FIG. 2
FIG. 3
| c<br>REFERENCE SIGNAL | b<br>ATTRIBUTE CHARACTERISTICS | a<br>MEDIA SIGNAL |
|---|---|---|
| c(a1) | b(a1)=(sound,10sec.,Interruption No) | a(a1) |
| c(a2) | b(a2)=(sound,5sec.,Interruption No) | a(a2) |
| c(a3) | b(a3)=[c(a1)+c(a2)] | |
| --- | ----- | |
| --- | ----- | |
| c(V1) | b(V1)=(Image,15sec.,Interruption Yes) | a(V1) |
| c(V2) | b(V2)=(Image,7sec.,Interruption No) | a(V2) |
| --- | ----- | |
| --- | ----- | | ical media to have coinciding

INFORMATION PROCESSING APPARATUS AND METHOD FOR COMBINING DIFFERENT MEDIA TO HAVE COINCIDING REPRODUCTION TIMES

This application is a continuation of U.S. application Ser. No. 08/159,287 filed Nov. 30, 1993, now abandoned.

FIELD OF THE INVENTION

This invention relates to an information processing apparatus for combining a plurality of data signals received from different media such as sound, image, etc. The data is combined into one multimedia representation of the data signals, with the reproduction times of the corresponding parts of the plurality of data signals coinciding to each other.

BACKGROUND OF THE INVENTION

In recent years, with the development of technologies for processing data signals for various media such as sound, image, etc., it has become desirable to develop technology to produce multimedia representations without difficulty.

Hereinafter, media is defined as each elementary means to carry sound or images, for example, which when combined form a multimedia representation.

One prior art method for producing multimedia representations was to combine a plurality of media such as sound, image, etc. using an editor. An editing person would edit the individual media manually so the reproducing times of the corresponding parts of the media coincided to each other. However, because of the complex relationship between the times of different media, it was difficult work for the editor.

In the Japanese Patent Provisional Publication No. Hei 5-3561, a method to produce a multimedia representation is disclosed which makes the reproducing times of image and sound coincide, when they are different, by extending or reducing the times of image and sound. However, this method extends or reduces the reproducing time of each media to the mean values of the media without any consideration for the characteristics of the sound and images. Sometimes this results in unnatural or incomplete reproduction, especially when the media whose reproducing time is extended or reduced is an image. For example, a scene of a man walking too fast or too slow will be notably unnatural.

SUMMARY OF THE INVENTION

The present invention relates to an information processing apparatus and method which easily generates automatically or at an editor's will and without any manual editing work, a multimedia representation with natural feeling and coinciding reproducing times for the different media without the omission of necessary information.

An information processing apparatus related to the present invention comprises: database means for storing a plurality of media signals which have corresponding reference signals, determining means for determining one processing method from among a plurality of processing methods obtained by combining attribute characteristics, and an information processing part which, based on the determined processing method, extends or reduces the reproduction time for each individual media signal, or discontinues an individual media signal as necessary.

The attribute characteristics include, with regard to the media signals, data giving reproducing times and the degree of yes or no for omitting or interrupting the media signals.

The attribute characteristics may also include, if necessary, data specifying the quantity of the media signals when a plurality of media signals are transferred to the information processing part. In addition, data identifying the relationship between the plurality of media signals or the reproduction order of the media signals can be provided.

The reference signals may be constructed with the attribute characteristics specifying that media signals of the same kind of media have some relationship to each other and specifying the order the related media signals are to be reproduced.

The apparatus may also include a document processing part which, upon receiving a sentence input, extracts reference data therefrom, and inputs the reference data into the processing-method-determining part.

The information processing apparatus related to the present invention thus constructed, determines a processing method from among a plurality of processing methods obtained from the attribute characteristics of the plurality of individual media signals. The individual media signals which correspond to each reference signal are retrieved from the database, based upon the attribute characteristics of the individual media signals. It then extends or reduces the reproduction times of the plurality of media or interrupts the reproduction as necessary. Thus, a multimedia representation which has a plurality of media signals with coinciding reproduction times can be easily accomplished.

Thus, according to the apparatus as defined above, any labor for coinciding the reproduction times of various media is saved, and a multimedia representation with natural feeling and with coinciding reproduction times of individual media without omission of necessary information is generated, easily and automatically, as directed by the editor.

BRIEF DESCRIPTION OF THE DRAWINGS

FIG. 1 is a block diagram showing the overall structure of the first exemplary embodiment of the information processing apparatus according to the present invention.

FIG. 2 is a block diagram showing the structure of the second exemplary embodiment of the information processing apparatus according to the present invention.

FIG. 3 is an example of the data stored in the database part of the first exemplary embodiment of the information processing apparatus according to the present invention.

DETAILED DESCRIPTION OF THE INVENTION

Figure 4:
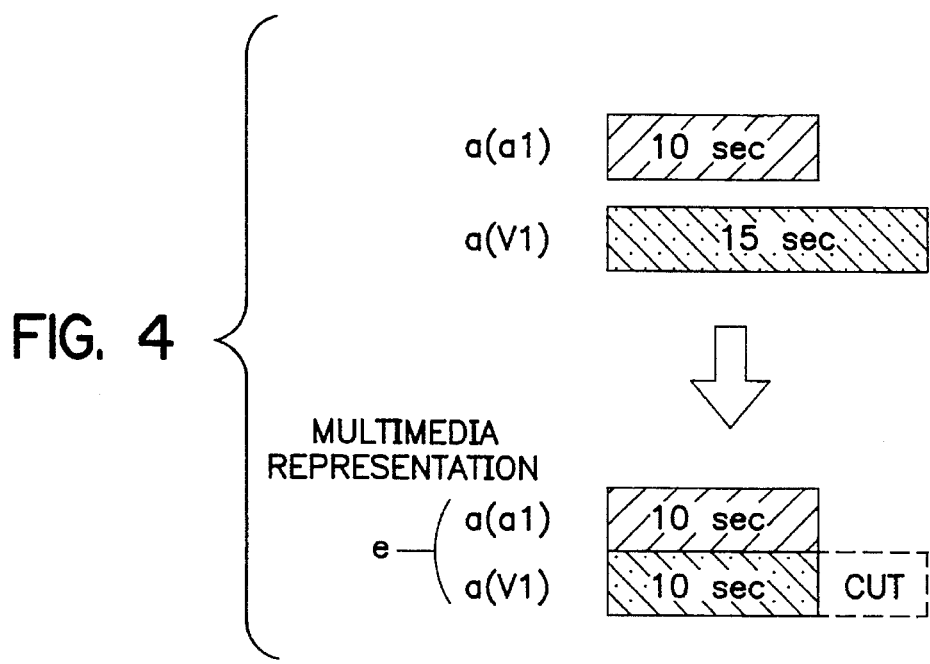
FIG. 4 is a first example of different media signals being combined according to the first exemplary embodiment of the information processing apparatus according to the present invention.

Referring to the drawings, exemplary embodiments of the information processing apparatus according to the present invention are explained.

Referring to FIG. 1, an information processing apparatus according to the first exemplary embodiment of the present invention comprises a database part 1, a processing-method-determining part 2, and an information processing part 3.

FIG. 3 shows an example of data stored in the database part. For one media signal stored in the database part, there would also be stored in the database part attribute characteristics and reference signals. For example, for media signal a(a1) stored in the database part, there would also be stored in the database part reference signal c(a1) and attribute characteristics b(a1).

The database part 1 stores a plurality of media signals, for example audio signal a(a), and video signal a(v), and attribute characteristics b of each individual media signal. The attribute characteristics consists of three elements; kind (e.g., type, such as audio or video), length of time, and "yes or no" for interruption of the single-medium. For example, attribute characteristics of audio signals b(a) and attribute characteristics of video signals b(v). Referring to the "yes or no" for interruption, if interruption of an individual signal a(a) results in the loss of the exact content of the signal, such as an audio signal containing news commentary, which will result in essential parts of the news being lost, then the interruption is treated as "no". If, on the other hand, interruption of an individual signal a(a), as in the case of an audio signal consisting of background music, results only in the loss of unimportant content, then the interruption is treated as a "yes".

The processing-method-determining part 2 selects and determines one processing method from among a plurality of processing methods. For example, if two different reference signals c(a) and c(v) referring to audio signal a(a) and video signal a(v) are inputted, the processing-method-determining part 2 retrieves out from the database part 1 attribute characteristics b(a) of audio signal a(a) corresponding to the reference signal c(a). It also reads out attribute characteristics b(v) of video signal a(v) corresponding to the reference signal c(v). Then the processing-method-determining part 2 selects and determines one processing method automatically or at the editor's will from among a plurality of plural processing methods d obtained by combining the attribute characteristics b(a) and b(v) as shown in the Table below.

The information processing part 3 produces a multimedia representation e, by combining the audio signals a(a) with reproduction time in its current state, reduced or extended, and visual media signals a(v) with reproduction speed unchanged.

When the processing-method-determining part 2 receives two reference signals c(a) and c(v) referring individually to audio signal a(a) and video signal a(v) which are desired to be combined, the processing-method-determining part 2 retrieves attribute characteristics b(a) and b(v) of audio signal a(a)

TABLE

| Attribute information | Sound | |
|---|---|---|
| | Interruption: No | Interruption: Yes |
| | Sound reproducing > time | Image reproducing time |
| | Image | |
| Interruption No | Image: Standard reproduction Sound: Speed changed (reduce) | Image: Standard reproduction Sound: Fade out |
| Interruption Yes | Image: Standard reproduction Sound: Speed changed (reduce) | Image: Standard reproduction Sound: Fade out |

TABLE-continued

| Attribute information | Sound | |
|---|---|---|
| | Interruption: No | Interruption: Yes |
| | Sound reproducing < time | Image reproducing time |
| Interruption No | Image: Standard reproduction Sound: Speed changed (Extend) | Image: Standard reproduction Sound: Speed changed (Extend) |
| Interruption Yes | Image: Reproduction interrupted Sound: Standard reproduction | Image: Reproduction interrupted Sound: Standard reproduction | and video signal a(v) corresponding to the reference signals c(a) and c(v) from the many attribute characteristics b(a) and b(v) stored in the database part 1. The processing-method-determining part 2 then determines, automatically or at the editor's will, one processing method d from a plurality of processing methods d which are obtained by combining these attribute characteristics b (a) and b (v).

Then, the information processing part 3 edits the two individual media signals a(a) and a(v) which were retrieved from the database part 1, based on the processing method determined in the processing-method-determining part 2. The information processing part 3 produces a multimedia representation consisting of the two media signals, in this case audio signal a(a) and video signal a(v) with coinciding reproduction times.

For example, as shown in FIG. 4, if the attribute characteristics b (a1) and b (v1) of the media signals a(a1) and a(v1) corresponding to the two reference signals c(a1) and c(v1) inputted into the processing-method-determining part 2 are "Sound, 10 seconds, Interruption No" and "Image, 15 seconds, Interruption Yes", the processing-method-determining part 2 determines a method d using this attribute characteristics. The method d chosen from the preceding table is that the sound is reproduced using standard reproduction and the image is interrupted. Method d is chosen from the preceding table by combining these attribute characteristics b(a1) and b(v1).

Then, the information processing part 3, based on the processing method d that the sound is reproduced using standard reproduction and the image is interrupted, edits so that the attribute characteristic b(a1) standard-reproduces the audio signal a(a1) consisting of "Sound, 10 seconds, Interruption No". It also reproduces the video signal a(v1) using the attribute characteristics b(v1) interrupting the video signal a(v1) consisting of "Image, 15 seconds, Interruption Yes", when 10 seconds, which is the reproduction time of the audio signal a(a1), has elapsed. Thus, a multimedia representation e with the same reproduction times for the audio signal a(a1) and the video signal a(v1) is produced.

Figure 5:
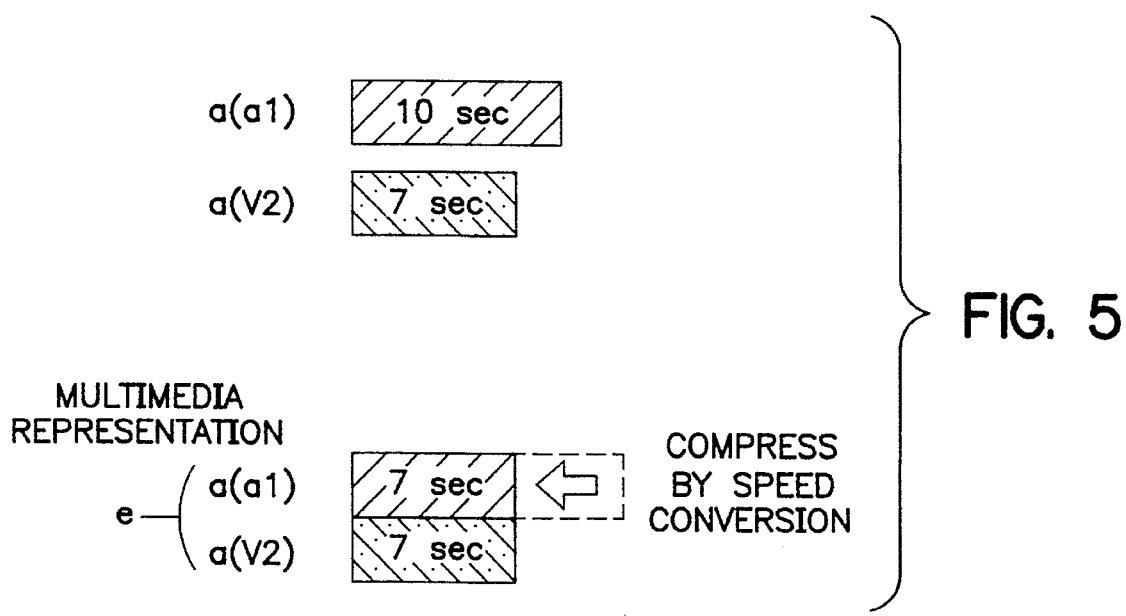
FIG. 5 is a second example of different media signals being combined according to the first exemplary embodiment of the information processing apparatus according to the present invention.

As shown in FIG. 5, if the attribute characteristics b(a1) and b(v2) for each individual media signal corresponding to the two reference signals c(a1) and c(v2) inputted into the processing-method-determining part 2 are "Sound, 10 seconds, Interruption No" and "Image, 7 seconds, Interruption No", the information processing part 2 determines the processing method d that sound is compressed by speed conversion, and image is standard-reproduced by combining the attribute characteristics b(a1) and attribute characteristics b(v2).

Then the information processing part 3, based on the processing method d that the sound is compressed by speed conversion, and image is standard-reproduced, compressreproduces the audio signal a(a1) whose attribute information is "Sound, 10 seconds, Interruption No" by converting the speed thereof so that the reproducing time thereof is 7 seconds. This is the reproduction time for the video signal a(v2). A multimedia representation e is thus formed with the reproducing time coinciding to the video signal a(v2) with attribute characteristics b(v2) "Image, 7 seconds, Interruption No".

The determination of the processing method d accomplished by combining the attribute characteristics b(a1) for the audio signal a(a1) and the attribute characteristics b(v2) for the video signal a(v2) is based on the consideration of whether interruption is possible so that omission of necessary information for the audio signal a(a1) or the video signal a(v2) is prevented.

Thus, according to the first exemplary embodiment of the present invention, it is determined whether the reproduction time of the audio signal is kept, compressed, or expanded, and the reproduction time of the video signal is kept or interrupted, by combining the attribute characteristics b(a) for the audio signal a(a) and the attribute characteristics b(v) for the video signal a(v). These correspond to the two reference signals c(a) and c(v) respectively.

If the quantity of data contained in the audio signal a(a) and video signal a(v) is large, especially the latter, the transferring of media signals a(a) and a(v) from the database part 1 to the information processing part 3 takes a long time. As a result, times for the audio signal a (a) and video signal a(v) to be combined may not coincide. In this case, the quantities of the audio signal a(a) and video signal a(v) are specified in the attribute characteristics b(a) and b(v). Then the processing method d for transferring from the processing-method-determining part 2 to the information processing part 3 is determined, and the effect of time delay caused while the media signals a(a) and a(v) are transferred from the database part 1 to the information processing part 3 is alleviated or absorbed by the information processing part 3, resulting in coinciding times.

The above explanation used as an example two media signals, audio and video. However, other media, for example computer graphic and computer data, can be treated in a similar manner. Also, instead of the attribute characteristics consisting of three elements, kind, time length, and "yes or no" of interruption as explained, any elements showing the characteristic of the media can be used. Thus, by increasing the kinds of media signals a and the elements of the attribute characteristics b, the processing methods for the media signals are increased, resulting in a more detailed editing process.

Now referring to FIG. 2, another information processing apparatus of the second exemplary embodiment of the present invention comprises, in addition to a database part 1, a processing-method-determining part 2, and an information processing part 3, which act in the same manner as the first exemplary embodiment, further includes a document-processing-part 4. The document-processing-part 4 converts an input text f to the reference signal c which refers to the media signals stored in the database part 1. The document-processing part 4 outputs the reference signal c to the processing-method-determining part 2. According to the information processing apparatus of the second exemplary embodiment so structured, an input of a sentence generates reference signals from which a multimedia information e is produced, more easily.

In the above exemplary embodiment, media signals of a multimedia representation generated by combining a plurality of media signals is not necessarily confined to one kind of media signal. For example, combination of video signal and audio signals is not limited to video of one scene and a speech of one paragraph, but may include video signals of one scene and a plurality of audio signals, for example, two separate speeches, may be assembled to make a multimedia representation. Alternately, a speech may be combined with video signals of two scenes related to the speech.

For the one scene, two speech case, when the reference signals c(a1), c(a2) and c(v1) are inputted, the attribute characteristics b(a1) and b(a2) for the same type of media include data values specifying that media signals of the same kind are to be combined, and data values prescribing the order of reproduction of the two audio signals. For the latter example, the attribute characteristics b(v) of the two video signals include data values specifying that the same kind of media is to be combined and data values providing the reproduction order of the video signals. Similarly, a plurality of video signals and a plurality of audio signals can be combined.

When individual media signals of the same kind of media are to be used and combined as one, they may be temporarily stored, taking the accessing time into consideration, in the memory included in the information processing part 3, and synthesized applying compression or expansion if necessary.

In addition, instead of giving the attribute characteristics b necessary for assembling the plurality of individual signals of one media, the reference signals c may be given the same function. Namely, it can be instructed with a reference signal c(a3) that an attribute characteristic b(a1) of an individual signal of the same kind of media and an attribute characteristic b(a2) of another individual signal of the same kind of media are to be combined as one and reproduced in a certain order.

As illustrated in the table above of the preferred embodiment, "Yes" or "No" of interruption for standard reproduction is provided as an alternative for processing the video signals. Further, the inclusion of the attribute characteristics "Yes" or "No" for compression or extension of video signals, provides another alternative for processing, slow or fast reproduction, of the video signals.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. An information processing apparatus comprising:

database means for storing a plurality of data signals wherein each one of said plurality of data signals is from a different kind of media and wherein each one of said plurality of data signals has corresponding attribute characteristics including a) type of said one of said plurality of data signals, b) reproduction time of said one of said plurality of data signals, and c) a data value indicating whether interruption of said one of said plurality of data is permitted or not permitted, wherein the attribute characteristics of said one of said plurality of data correspond to s respective reference signal, processing-method-determining means responsive to input reference signals, for retrieving from the database means, said attribute characteristics corresponding claim to said input reference signals and for combining said retrieved attribute characteristics to determine a processing method from a plurality of processing methods, means for retrieving data signals of said different kind of media from said database means, the retrieved data signals corresponding to the retrieved attribute characteristics, and information processing means, in response to said determined processing method, for a. combining the retrieved data signals, b. varying a reproduction time for the retrieved data signals corresponding to the retrieved attribute characteristics, and c. interrupting the retrieved data signals corresponding to the retrieved attribute characteristics only when interruption is permitted, wherein a multimedia representation is produced including each one of said plurality of data signals corresponding to said retrieved attribute characteristics and wherein said plurality of data signals corresponding to said retrieved attribute characteristics have substantially the same reproduction times.

2. The information processing apparatus of claim 1, wherein said database means includes reference signals corresponding to the attribute characteristics.

3. The information processing apparatus of claim 1, wherein said data signals include an amount of data and said corresponding attribute characteristics include a data value specifying the amount of data in said plurality of data signals when more than one of said plurality of signals are transferred from the database means to the information processing means.

4. The information processing apparatus of claim 1 further comprising document processing means for converting input text into said reference signal and for inputting said reference signal into said processing-method-determining means.

5. The information processing apparatus of claim 1, wherein at least one of said attribute characteristics includes data values indicating that a group of said plurality of data signals are of the same kind of media.

6. The information processing apparatus of claim 1, wherein at least one of said attribute characteristics specifies a reproduction order in which a group of said plurality of data signals of a same kind of media are to be reproduced.

7. The information processing apparatus of claim 1, wherein at least one of said reference signals includes data values, derived from said attribute characteristics, identifying a group of said plurality of data signals representing a same kind of media and said data values further indicating a reproduction order of said plurality of media signals in said group.

8. The information processing apparatus of claim 1, wherein the retrieved data signals include (a) a first data signal having corresponding first attribute characteristics which indicate interruption is permitted and a second data signal having corresponding second attribute characteristics which indicate interruption is not permitted, wherein the information processing means combines the first data signal with the second data signal by interrupting the first data signal.

9. The information processing apparatus of claim 1, wherein the retrieved data signals include (a) a first data signal having corresponding first attribute characteristics which indicate interruption is permitted and a second data signal having corresponding second attribute characteristics which indicate interruption is not permitted, wherein the information processing means combines the first data signal with the second data signal by varying a reproduction time of the first data signal.

10. The information processing apparatus of claim 1, wherein the information processing means interrupts the retrieved data signals corresponding to the retrieved attribute characteristics only when interruption is permitted by the data value in the retrieved attribute characteristics.

11. A method of processing information comprising the steps of:

storing a plurality of data signals, storing attribute characteristics including
 a) type of each one of said plurality of data signals,
 b) reproduction time of each one of said plurality of data signals, and
 c) a data value indicating whether interruption of each one of said plurality of data signals is permitted or not permitted, storing reference signals corresponding to each one of said plurality of attribute characteristic for retrieving a plurality of data signals wherein each one of said plurality of data signals corresponds to a different media, receiving a plurality of different reference signals, each of said reference signals identifying a respective stored attribute characteristics, retrieving said stored attribute characteristics identified by said plurality of different reference signals, combining said retrieved attribute characteristics to select a processing method from a plurality of processing methods, and interrupting said plurality of data signals corresponding to the retrieved attribute characteristics only when interruption is permitted, to produce a multimedia representation including each one of said plurality of data signals corresponding to said retrieved attribute characteristics with substantially the same reproduction times.

12. The method according to claim 11, wherein interruption of the plurality of data signals corresponding to the retrieved attribute characteristics is permitted only when interruption is permitted by the data value in the retrieved attribute characteristics.

* * * * *

UNITED STATES PATENT AND TRADE MARK OFFICE
CERTIFICATE OF CORRECTION

PATENT NO. : 5,611,039
DATED : March 11, 1997
INVENTOR(S) : Nobori et al.

It is certified that error appears in the above-identified patent and that said Letters Patent is hereby corrected as shown below:

On the cover page, item [56] References Cited, Other Publications add:

Bulterman et al., "A Structure for Transportable, Dynamic Multimedia Documents", USENIX Summer '91, pp. 137-155.

Stotts et al., "Temporal Hyperprogramming", J. of Visual Languages and Computing (1990) 1, pp. 237-253.

Buchanon et al., "Scheduling Multimedia Documents Using Temporal Constraints", Proc. of 3rd Int'l Workshop on Network and Operating System Support for Digital Audio and Video, pp. 1-13.

Column 6, line 59, after "data" insert --signals--.

Column 6, line 61, after "data" insert --signals--.

Column 6, line 61, delete "s" and insert --a--.

Column 7, line 30, before "signals" insert --data--.

Signed and Sealed this

Twelfth Day of August, 1997

*Attest:*

BRUCE LEHMAN

*Attesting Officer*      *Commissioner of Patents and Trademarks*